(12) United States Patent
Rahman et al.

(10) Patent No.: US 8,508,570 B2
(45) Date of Patent: Aug. 13, 2013

(54) METHOD TO POPULATE CONTACT LIST FROM RECENT CALL LOG

(75) Inventors: Tanvir Rahman, Austin, TX (US); Krishna Sai, Austin, TX (US)

(73) Assignee: Polycom, Inc., San Jose, CA (US)

( * ) Notice: Subject to any disclaimer, the term of this patent is extended or adjusted under 35 U.S.C. 154(b) by 1401 days.

(21) Appl. No.: 12/190,406

(22) Filed: Aug. 12, 2008

(65) Prior Publication Data

US 2010/0039495 A1   Feb. 18, 2010

(51) Int. Cl.
*H04N 7/14* (2006.01)
(52) U.S. Cl.
USPC .................. 348/14.03; 348/14.01; 348/14.08; 379/355.04
(58) Field of Classification Search
USPC .................. 348/14.01–14.16; 379/133–134, 379/140, 355.04
See application file for complete search history.

(56) References Cited

U.S. PATENT DOCUMENTS

| | | | |
|---|---|---|---|
| 6,760,431 B1 * | 7/2004 | Haimi-Cohen | 379/355.01 |
| 6,882,709 B1 * | 4/2005 | Sherlock et al. | 379/90.01 |
| 7,050,565 B2 * | 5/2006 | Sylvain | 379/265.09 |
| 7,088,805 B1 * | 8/2006 | Moore et al. | 379/121.05 |
| 7,644,096 B2 * | 1/2010 | Sjolander | 707/999.101 |
| 7,734,710 B2 * | 6/2010 | Seligmann et al. | 709/207 |
| 8,204,192 B1 * | 6/2012 | Suhail et al. | 379/142.06 |
| 2003/0043260 A1 * | 3/2003 | Yap et al. | 348/14.06 |
| 2006/0116113 A1 * | 6/2006 | Gass | 455/414.4 |
| 2007/0038720 A1 * | 2/2007 | Reding et al. | 709/217 |
| 2007/0081522 A1 * | 4/2007 | Apelbaum | 370/352 |
| 2007/0243898 A1 * | 10/2007 | Eyre et al. | 455/552.1 |
| 2007/0291108 A1 * | 12/2007 | Huber et al. | 348/14.02 |

* cited by examiner

*Primary Examiner* — Curtis Kuntz
*Assistant Examiner* — Ryan Robinson
(74) *Attorney, Agent, or Firm* — Wong, Cabello, Lutsch, Rutherford & Brucculeri, L.L.P.

(57) ABSTRACT

A method for efficiently accessing pertinent information retrieved from a videoconferencing system call log. System call logs typically contain a chronological list of raw information pertaining to inbound and outbound videoconferencing calls. The method for efficiently accessing this chronological information is performed using input from the user at an endpoint to correlate and sort for display the information required at the current time. Videoconferencing systems typically are shared use or community type devices and the method of this disclosure allows for more user friendly access to pertinent information. Auto population of a speed dial list or associating a smart tag with the retrieved information is another possible feature to aid the end user. This method will allow a business to more efficiently use a limited number of videoconferencing systems amongst diverse groups of users with diverse calling needs.

15 Claims, 4 Drawing Sheets

| Date | Time | Type | Caller Nm | Called Nm | Called Ad | Caller Ad |
|---|---|---|---|---|---|---|
| 1/1/07 | 10:00 | OB | Hou VC1 | SanC VC4 | 4-1234 | 1-1234 |
| 1/2/07 | 14:00 | IB | Hou VC1 | SanC VC4 | 4-1234 | 1-1234 |
| 1/2/07 | 11:00 | OB | Hou VC1 | SanC VC4 | 4-1234 | 1-1234 |
| 1/2/07 | 12:00 | OB | Hou VC1 | SanC VC4 | 4-1234 | 1-1234 |
| 1/3/07 | 13:00 | OB | Hou VC1 | SanC VC4 | 4-1234 | 1-1234 |
| 1/3/07 | 14:00 | IB | Hou VC1 | SanC VC4 | 4-1234 | 1-1234 |
| 1/4/07 | 10:00 | OB | Hou VC1 | SanC VC4 | 4-1234 | 1-1234 |
| 1/5/07 | 11:00 | OB | Hou VC1 | SanC VC4 | 4-1234 | 1-1234 |
| 1/5/07 | 12:00 | OB | Hou VC1 | SanC VC4 | 4-1234 | 1-1234 |
| 1/5/07 | 13:00 | IB | Hou VC1 | SanC VC4 | 4-1234 | 1-1234 |
| 1/5/07 | 14:00 | OB | Hou VC1 | SanC VC4 | 4-1234 | 1-1234 |
| 1/6/07 | 10:00 | OB | Hou VC1 | SanC VC4 | 4-1234 | 1-1234 |
| 1/6/07 | 12:00 | IB | Hou VC1 | SanC VC4 | 4-1234 | 1-1234 |
| 1/6/07 | 13:00 | OB | Hou VC1 | Del VC3 | 3-1234 | 1-1234 |
| 1/6/07 | 14:00 | OB | Hou VC1 | Dal VC2 | 2-1234 | 1-1234 |
| 1/6/07 | 15:00 | OB | Hou VC1 | SanC VC4 | 4-1234 | 1-1234 |
| 1/7/07 | 10:00 | OB | Hou VC1 | SanC VC4 | 4-1234 | 1-1234 |
| 1/7/07 | 11:00 | OB | Hou VC1 | SanC VC4 | 4-1234 | 1-1234 |
| 1/7/07 | 12:00 | IB | Hou VC1 | SanC VC4 | 4-1234 | 1-1234 |
| 1/8/07 | 13:00 | OB | Hou VC1 | SanC VC4 | 4-1234 | 1-1234 |
| 1/8/07 | 14:00 | OB | Hou VC1 | SanC VC4 | 4-1234 | 1-1234 |
| 1/9/07 | 15:00 | OB | Hou VC1 | SanC VC4 | 4-1234 | 1-1234 |
| 1/9/07 | 12:00 | IB | Hou VC1 | SanC VC4 | 4-1234 | 1-1234 |
| 1/10/07 | 10:00 | OB | Hou VC1 | SanC VC4 | 4-1234 | 1-1234 |
| 1/10/07 | 12:00 | OB | Hou VC1 | SanC VC4 | 4-1234 | 1-1234 |
| 1/10/07 | 13:00 | OB | Hou VC1 | SanC VC4 | 4-1234 | 1-1234 |
| 1/11/07 | 10:00 | IB | Hou VC1 | SanC VC4 | 4-1234 | 1-1234 |
| 1/11/07 | 11:00 | OB | Hou VC1 | SanC VC4 | 4-1234 | 1-1234 |
| 1/11/07 | 13:00 | OB | Hou VC1 | SanC VC4 | 4-1234 | 1-1234 |
| 1/12/07 | 11:00 | IB | Hou VC1 | SanC VC4 | 4-1234 | 1-1234 |
| 1/13/07 | 13:00 | OB | Hou VC1 | SanC VC4 | 4-1234 | 1-1234 |
| 1/14/07 | 10:00 | OB | Hou VC1 | SanC VC4 | 4-1234 | 1-1234 |

FIG. 1

| Date | Time | Type | Caller Nm | Called Nm | Called Ad | Caller Ad |
|---|---|---|---|---|---|---|
| *** | **** | ** | Hou VC1 | SanC VC4 | 4-1234 | 1-1234 |
| 1/6/07 | 13:00 | OB | Hou VC1 | Del VC3 | 3-1234 | 1-1234 |
| 1/6/07 | 14:00 | OB | Hou VC1 | Dal VC2 | 2-1234 | 1-1234 |

FIGURE 2

METHOD TO POPULATE CONTACT LIST FROM RECENT CALL LOG

BACKGROUND

This disclosure relates generally to organizing call log records from a videoconferencing system to generate a contact listing of already dialed numbers. More particularly, but not by way of limitation, to a method of presenting a calling list based on user defined input parameters used to filter all available call log records to allow easy initiation of a new call.

Because of the nature of videoconferencing systems, most people use videoconferencing systems to communicate with a limited set of people and remote systems. Heretofore there has been no easy way to look at and find the contact information for a specific person from that specific group of people with whom a user has most frequently interacted without searching through a system call log. The system call log typically includes duplicated entries along with other information that is not relevant to the current user's attempt to place a call. The system call log may also contain numerous entries from other users of the same videoconferencing system and that may make this user's task of locating contact information in a system call log more difficult.

SUMMARY

In one embodiment, a method is provided to compress the redundant data in a videoconferencing system call log to enable a user to select a record of interest to perform an action pertaining to the videoconferencing system identified by the record of interest. The method includes determining which information in the system call log is redundant; creating an interim format for parsing and optional later use; and presenting the filtered information to the end user of the videoconferencing system. A compressed intermediate file may be stored in any media that is readable and executable by a computer system or videoconferencing system for later use in populating the same or even a different videoconferencing systems speed dialing directory.

BRIEF DESCRIPTION OF THE DRAWINGS

FIG. 1 illustrates a table of "raw data" in a system call log from a general use conference room.

FIG. 2 illustrates a possible "filtered" response to a user request.

DETAILED DESCRIPTION

Figure 3:
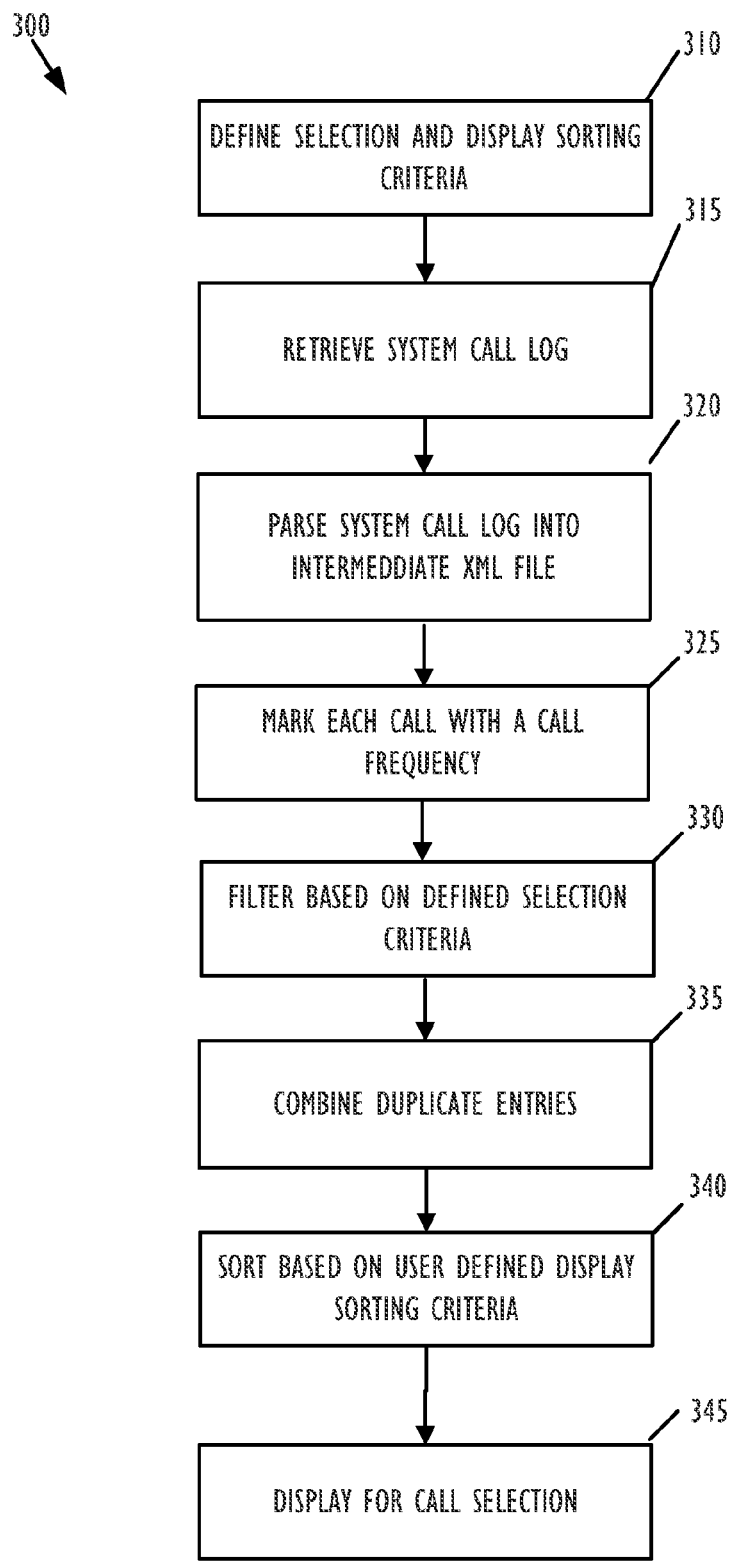
FIG. 3 illustrates, in flow chart form, a typical use case for this disclosure.

The following description is presented to enable any person skilled in the art to make and use the claimed invention and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

In the interest of clarity, not all features of an actual implementation are described in this specification. It will be appreciated that in the development of any such actual implementation, numerous decisions must be made to achieve the developer's specific goals (e.g., compliance with system-related and business-related constraints), and that these goals will vary from one implementation to another. It will be appreciated that such development effort might be complex and time-consuming, but would nevertheless be a routine undertaking for those of ordinary skill having the benefit of this disclosure.

The present disclosure relates to optimizing the ability of individual users to interact with the system call log of a videoconferencing system. Videoconferencing systems typically feature a call log that records all inbound and outbound call information for the device. In this disclosure, an entry in a call log will be referred to as a "component item." Each component item can include information such as: date and time of the call, type of the call (i.e., inbound or outbound), type of communication protocol (e.g., H.323, H.320, etc.), caller name (ID), site, caller address (e.g., system address), called address, etc.

Videoconferencing systems are often located in a general use area such as a conference room of an office building. As such, these devices are used by a general population of users that may be required to interact with disparate parties. Because of this interaction amongst different and distinct groups of parties, the system call log in its generic form may not allow a particular user to easily retrieve the information that is pertinent for their use. These and other problems may be solved by allowing a user to define a set of selection criteria to be used while retrieving information and creating a "processed data set" from the system call log of a videoconferencing system.

To allow efficient presentation of the possibly voluminous information contained in the system call log, the system and method described herein allow the user to provide various selection criteria. In one embodiment the selection criteria can include: most frequently dialed calls above a certain threshold value (e.g., 5, 10 or 15 entries), only inbound calls, only outbound calls, combination of both inbound and outbound calls, time range of calling activity specified by start and end date or number of previous days, etc.

Similarly, once the information is retrieved, display sorting criteria can assist the user in identification of the particular information sought. The display sorting criteria can include: name of caller, name of called endpoint, call type, or time (e.g., oldest to newest or vice versa), etc. By allowing the user to specify the granularity and type of information required, the user is able to more easily create and display a processed data set to obtain the desired information from the system call log.

As an example, assume 500 non-duplicated calls were made during the January to December time frame. The system described herein can allow a user to select a specific month and display the calls that are placed during that time. It further allows a user to restrict the size of call list with a specified number. If a user selects February, during which time 100 calls were made, and restricts the display list size to 10, then the VC unit will display only 10 non-duplicated calls that were most frequently made in February.

By way of another example, consider a corporation with multiple offices located in different geographic regions across the United States. The offices are located in Dallas, Houston, Delaware, and San Clemente. Each of these offices may provide a different set of business functions, for this example corporation, as can be seen in each column of the following table.

| Houston      | Dallas       | Delaware     | San Clemente |
|--------------|--------------|--------------|--------------|
| VC System 1  | VC system 2  | VC system 3  | VC system 4  |
| Sales        | Sales        |              | Sales        |
| Executive Offices |         |              |              |
| Research and |              |              | Research and |
| Development  |              |              | Development  |
| Financials   |              |              |              |
| Corporate Legal |           | Corporate Legal |           |

Therefore, the videoconferencing system located in Houston (i.e., VC1) might be used by a corporate community to hold video meetings with each of the other videoconferencing systems VC2, VC3, and VC4. The system call log of VC1 may contain many calls made by the sales team to both VC2 and VC4, in addition to the calls made by the R&D group to VC4. The corporate legal department may also use the system with those calls likely connected between VC1 and VC3. The financial team in Houston may also use the VC1 system to connect calls to systems outside of the example corporate community.

During the lifecycle of new product development it is typical for an R&D group to communicate frequently at both the beginning and the end of the development cycle. Toward the end of a new product development cycle it is typical for the Sales teams to communicate frequently to coordinate the launch of the new product. Corporate legal departments may not place calls that are keyed to any particular development cycle as their business function is less driven by a single development project.

Because of the cyclical nature of the use of the different VC systems it would not be unusual for the most recent calls in the VC system call log to represent the activity of a different set of users from the corporate community. Therefore, a user trying to use the system call log to place a call may have to scroll through a multitude of undesired call entries to place a call to their location of interest.

This problem can be overcome by automatically grouping multiple calls to a given location into a single entry in the dialing list. By grouping the redundant information using user defined grouping criteria the user is able to quickly recover the dialing instructions of interest from the system call log.

FIG. 1 shows an exemplary unparsed system call log for the videoconferencing system VC1. In this condensed example, it can be seen that keeping the information in a purely chronological format allows for multiple "redundant" entries (i.e., calls that differ only by date, time and type) to obscure other entries. A corporate executive might only be interested in historical calls to Delaware office 100 while a sales person might only be interested in using the record for the call placed to the Dallas office 110. By removing all the redundant entries in the raw data there could be presented a selection dialog that only contains three entries (shown in FIG. 2) because all of the calls between Houston and San Clemente could be compressed into a single record. It should be understood that this is a relatively simple example for a condensed time frame and the total number of records in a system call log might be substantially more voluminous than this example, rendering the system described herein even more beneficial.

Note that in FIG. 2 the information required by a member of the executive or sales groups could be presented for selection even if it was far down in the system call log. Thus, the member of the executive or sales teams is not presented information that is not pertinent to his attempt to place a call to a location group of interest.

After a user identifies a location group of interest, the user might also be presented with an option to store the selection criteria in the system or automatically populate the system speed dial database with a user defined tag for a later use of the system. By allowing the user to store a user defined tag the system can present the desired information without the need to enter complete selection and sort criteria.

FIG. 3 shows, in flow chart form, a typical use case 300 of the system described herein. The user can be prompted at box 310 to define proper selection and display sorting criteria. The video conference call log can be retrieved at box 315 and translated into a format such as an extensible Markup Language "XML" file at box 320. The XML file may be stored as an intermediate file and stored for current and future use. This XML intermediate file can be used to mark each call with its frequency and type at box 325. For example, a map of key-value pairs may be used; where the key may be the name of an entry, and the value may be the number of times calls are being placed or received from that specific entry. Each of the input records can then be filtered based on user defined selection criteria, and all records that are not of current interest can be removed at box 330. All redundant records can optionally be removed to compress the list for display at box 335. In one example embodiment, as few as two matching fields can cause a call to be marked as redundant although any number of matching fields could be used depending on the particular embodiment. For example, if the name of the caller or called party matches the name of the caller or called party from a previous call in the list and the address of the caller or called party matches the address of the caller or called party from a previous call in the list then the record can be marked as redundant and suppressed from displaying multiple times.

Once the information from the system call log has been retrieved and filtered based on the selection sort criteria, the retained information may be optionally stored for later use or used as input to the display sorting routine at box 340. The list can be sorted based on the user defined sorting criteria. For example, the list can be sorted based on the frequency of calls and to remove records that exceed the user input display limit. Note that the entries removed because of a display limit will typically be those that have the lowest frequency count in the filtered list. Thus culled and sorted information can be presented to the user at box 345.

Even though this disclosure has been explained in the context of a videoconferencing system, those skilled in the art will recognize that this disclosure could be used in many other types of user interactive devices. These devices include but are not limited too: telepresence systems, cell phones, personal digital assistants (PDAs) and home phone caller id systems.

As mentioned above, an intermediate file may have been stored in an intermediate file for later use. The intermediate file, which contains parsed system call log records, may provide the user several degrees of flexibility. This intermediate file may be saved and used as a source to populate a different videoconferencing system and potentially eliminate the need to set system speed dial numbers. The intermediate file may be shared as an input source amongst several videoconferencing systems to provide a comprehensive calling directory for each of the videoconferencing systems sharing the information. Any kind of external call information directory, such as a database containing contact information, could also be processed into this intermediate file format for easy population of a call log or an address book of one or more videoconferencing systems.

In alternate embodiments, the population of the videoconferencing system log file could be from one or more sources including but not limited to: system log files from other available videoconferencing systems, external log files, or other external files containing videoconferencing call log data. For example, the source could comprise a composite of system call logs from all videoconferencing systems called from the first videoconferencing system more times than a user defined threshold.

Figure 4:
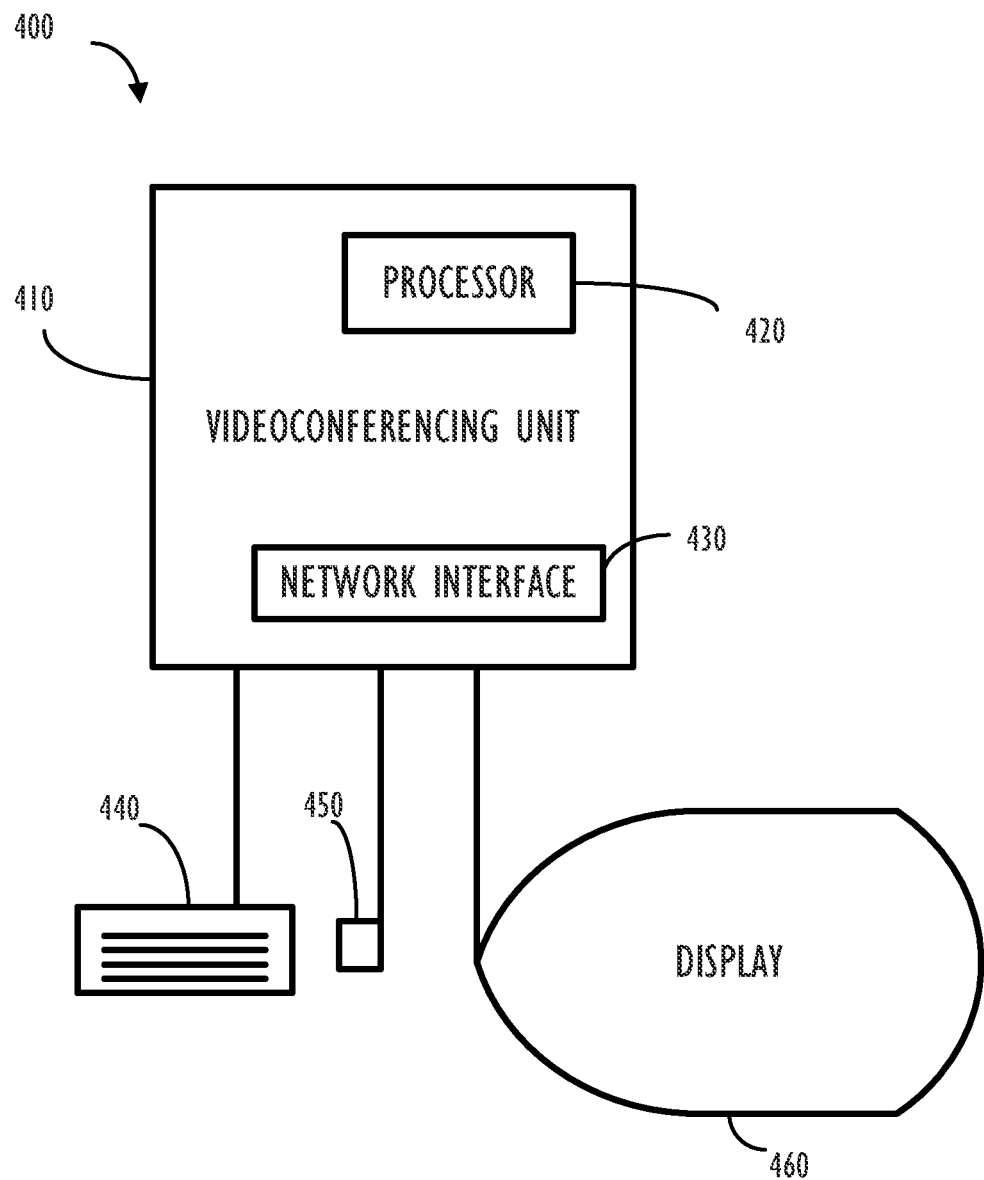
FIG. 4 illustrates a block diagram of one embodiment of a videoconferencing system.

FIG. 4 shows a block diagram of one embodiment of a videoconferencing system 400. The videoconferencing unit (410) contains a processor (420) which can be programmed to perform various data manipulation and collection functions. The videoconferencing unit (410) also contains a network interface (430) which is capable of communicating with other network devices using Asynchronous Transfer Mode (ATM), Ethernet, token ring or any other network interface or protocol known to those of skill in the art. Example input devices (keyboard 440 and mouse 450) are connected to the videoconferencing unit and provide for user interaction with the videoconferencing system. Display 460 is an example output device, which may also comprise a touch screen input capability, for displaying both images and textual information in the form of user menus as explained throughout this disclosure.

Various changes to the systems and methods disclosed herein are possible without departing from the scope of the following claims. For instance, the illustrative propagation method may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with the methods of this disclosure may be performed by a programmable control device executing instructions organized into one or more program modules. A programmable control device may be a single computer processor, a special purpose processor (e.g., a digital signal processor, "DSP"), a plurality of processors coupled by a communications link, or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable media, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

We claim:

1. A videoconferencing system dialing method, comprising:
    identifying, based on one or more user-defined selection criteria, log records of interest retrieved from a source, wherein the source comprises a system log from a first videoconferencing system and one or more of: a videoconference system call log, a system log from a second videoconferencing system, an external file containing system log information, or an external call information directory and, wherein the source comprises a composite of system call logs retrieved from a plurality of videoconferencing systems called from the first videoconferencing system more times than a user defined threshold;
    processing the log records of interest for presentation to an end user;
    determining, for each log record of interest, if the log record represents a duplicate of another log record;
    condensing the duplicates into a single entry, thereby creating a processed data set;
    presenting the processed data set;
    receiving a user selection of a component item in the processed dataset; and
    performing a user defined action pertaining to the component item identified by user selection.

2. The method of claim 1 wherein the source comprises one or more previously created intermediate file format input files.

3. The method of claim 1 wherein the user defined selection criteria comprises most frequently called systems within a given time range.

4. The method of claim 1 wherein the user defined selection criteria comprises systems called multiple times.

5. The method of claim 1 wherein processing the log records of interest produces an intermediate file format for later use as an input source.

6. The method of claim 1 wherein selecting a presented item and performing a user defined action performs an act of calling a system associated with the selected item.

7. The method of claim 1 wherein selecting a presented item and performing a user defined action performs an act of storing or deleting a record for the selected item in a speed dial database for the first videoconferencing system.

8. The method of claim 1 wherein identifying log records of interest includes using criteria previously defined and associated with a previously defined tag.

9. The method of claim 1 further comprising filtering the processed data set based on user-supplied display filtering criteria.

10. The method of claim 1 further comprising sorting the processed data set based on user-supplied sorting criteria.

11. The method of claim 1 wherein the user defined action places a tag on the log record of interest and stores tag information for future use.

12. A videoconferencing system comprising:
    a programmable processing unit;
    a network communication device communicatively coupled to one or more other videoconferencing devices wherein the input log records are retrieved via the network communication device; and
    a user input device coupled to the programmable processing unit wherein the programmable processing unit is configured to perform the acts of:
    identifying, based on one or more user-defined selection criteria, log records of interest retrieved from a source, wherein the source comprises a composite of system call logs retrieved from a plurality of videoconferencing systems called from the videoconferencing system more times than a user defined threshold;
    processing the log records of interest for presentation to an end user;
    determining, for each log record of interest, if the log record represents a duplicate of another log record;
    condensing the duplicates into a single entry, thereby creating a processed data set;
    presenting the processed data set;
    receiving a user selection of a component item in the processed dataset; and
    performing a user defined action pertaining to the component item identified by user selection.

13. The videoconferencing system of claim 12 wherein the programmable processing unit is further configured to perform the act of sorting the processed data set based on user-supplied sorting criteria.

14. A non-transitory computer readable medium comprising instructions stored there on for causing a programmable control device to implement the method of claim 1.

15. A system dialing method, comprising:
identifying log records of interest retrieved from one or more sources, the identification being based on one or more user-defined selection criteria, wherein the one or more sources comprise a composite of system call logs retrieved from a plurality of videoconferencing systems called from a videoconferencing system more times than a user defined threshold;
processing the log records of interest for presentation to an end user;
determining for each log record retrieved from the one or more sources if the log record represents a duplicate entry of an already processed log record and creating a processed data set containing less than or equal to the number of log records originally retrieved from the one or more sources;
presenting the processed data set;
selecting a presented item and performing a user defined action pertaining to the item identified by user selection.

* * * * *